(12) United States Patent
Bonebrake

(10) Patent No.: US 8,662,380 B1
(45) Date of Patent: Mar. 4, 2014

(54) MODULAR CORRUGATED REUSABLE CRATE SYSTEM

(76) Inventor: Daniel James Bonebrake, Keizer, OR (US)

( * ) Notice: Subject to any disclaimer, the term of this patent is extended or adjusted under 35 U.S.C. 154(b) by 0 days.

(21) Appl. No.: 13/591,956

(22) Filed: Aug. 22, 2012

(51) Int. Cl.
*B65D 5/32* (2006.01)
*B65D 5/56* (2006.01)

(52) U.S. Cl.
USPC .............. 229/122.21; 229/122.3; 229/122.32; 229/122.34; 229/198.2

(58) Field of Classification Search
USPC .............. 229/122.21, 122.26, 122.3, 122.32, 229/122.34, 198.2, 939
See application file for complete search history.

(56) References Cited

U.S. PATENT DOCUMENTS

| | | | |
|---|---|---|---|
| 2,185,920 A | | 1/1940 | Martin |
| 2,336,345 A | * | 12/1943 | Carison ........................... 229/5.5 |
| 2,766,923 A | * | 10/1956 | D Esposito .................... 206/320 |
| 3,128,033 A | | 4/1964 | Cook |
| 3,414,184 A | * | 12/1968 | Loheed ....................... 229/198.2 |
| 3,608,769 A | | 9/1971 | Gablin |
| 3,672,558 A | | 6/1972 | Johnson |
| 3,726,467 A | * | 4/1973 | Shepherd ................... 229/122.3 |
| 3,863,831 A | * | 2/1975 | Wozniacki et al. ...... 229/122.26 |
| 4,090,659 A | * | 5/1978 | Galmiche et al. ............. 206/386 |
| 4,143,763 A | | 3/1979 | Haglund |
| 4,190,189 A | * | 2/1980 | DeForest ........................ 229/5.6 |
| 4,746,061 A | | 5/1988 | Arvanigian |
| 5,042,713 A | | 8/1991 | Stafford |
| 5,215,248 A | * | 6/1993 | Moser ....................... 229/122.21 |
| 5,289,969 A | * | 3/1994 | Schwaner ................ 229/122.21 |
| 5,427,306 A | * | 6/1995 | Petriekis et al. .......... 229/122.21 |
| 5,595,304 A | | 1/1997 | Timmins |
| 5,967,406 A | * | 10/1999 | Moorman ................ 229/122.26 |
| 6,138,903 A | * | 10/2000 | Baker ....................... 229/122.32 |
| 7,462,147 B2 | * | 12/2008 | Ludovissie et al. ......... 229/122.3 |
| 7,883,001 B2 | * | 2/2011 | Goodrich .................. 229/122.32 |
| 2003/0094483 A1 | * | 5/2003 | Chu ........................... 229/122.3 |
| 2007/0146143 A1 | | 6/2007 | Cote et al. |
| 2010/0072105 A1 | | 3/2010 | Glaser et al. |
| 2012/0097602 A1 | | 4/2012 | Tedford |
| 2012/0132562 A1 | | 5/2012 | Tumminia et al. |

* cited by examiner

*Primary Examiner* — Gary Elkins
(74) *Attorney, Agent, or Firm* — Robert J. Ireland

(57) ABSTRACT

The inventive crate has a bottom base, two opposing side panels, two opposing interlocking end panels, and a top cap. The bottom base having a length and width larger than the X-width and Y-length dimensions of the cargo to be shipped, the opposing side panels are coextensive to the Y-length of the cargo as fitting within the bottom base lip and a height matching the cargo's Z-height. The interlocking end panels have a side interlock with a width slightly less than the thickness of the side panel, and a corner tab. When assembled, each side panel at each end inserts against the side interlocks at each corner compressively securing with the folding over of each corner tab crushingly sandwiching the side panel between the slightly crushed corner tab and center section as held fast by the bottom lip. The top cap covers the upper portion of the assembled panels.

8 Claims, 6 Drawing Sheets

MODULAR CORRUGATED REUSABLE CRATE SYSTEM

GOVERNMENT INTEREST STATEMENT

None

BACKGROUND

1. Field of the Invention

The invention relates to a shipping crate formed from laminated corrugated material, such as paper board, card board, or recycled fiber product, and in particular to a modular component crate system whose design provides a customizable crate option that ships self-contained, easily assembles without tools, and is reusable as a system or in discrete parts, and when assembled having a stackable compression strength exceeding one hundred times the weight of the assembled crate.

2. Brief Description of the Prior Art

Shipping crates made from wood are expensive, difficult to breakdown, and are not generally recyclable or reusable. Corrugated mediums as used in crating are gaining popularity but generally are limited in application because of the corrugated mediums having susceptibilities to degradation in strength, complications in assembly, and so damaged during unpacking or break down that the entire used crate must be disposed of as waste.

Corrugated crating options are fabricated so that the corrugated medium having longitudinal air spaces or columns referred to in the art as flutes are vertically disposed thereby providing the greatest compression strength. In later versions of corrugated crating options the fabrication mediums of corrugated materials are laminated, such that one layer is vertically disposed and the next layer is horizontally disposed thereby forming stacks of corrugated medium to increase the load bearing strength of the crate. However, the corrugated materials used today are usually strong only once, and the stresses and environment of shipping quickly degrade the corrugate materials, breaking down the paper fiber bonds, creating sloppy fits, loose attachments, and corrugated crate failures. The sloppy fit components get worse as the crate is shipped, and negates any opportunity to reuse the crate in the entirety or reuse the discrete components.

Currently available corrugated crating options are fabricated such that the corrugated medium's strength is maximized relative to the aggregate weight of the crate, with an aim of minimizing materials used thereby decreasing expense, all for the 'one time use' purpose. The advantage of adding two or more layers of corrugated paper as laminated together is well known in the art to significantly increases the crush strength of the constructed crate while minimally increasing the crate's weight or expense. Analogous to plywood products, the panel of laminated mediums may be cut and assembled with other panels to form rigidly strong structure. However, a serious problem with the corrugated card board or paper panels as used for shipping crates is that the panels are usually discarded after opening, usually due to damage, and much of the glues or adhesives used to laminate the corrugated sheets are not recyclable and are not compostable. In short, the corrugated crate option results in an increase in waste mass and storage of the same, requiring frequent disposal or an increase in waste storage capacity.

Reusing the corrugated crate as a shipping container has not been effectively achievable due to gluing, stapling, or fixating the corrugated panels or members together during the original assembly. The components of the corrugated crate generally are permanently fixated to be used once effectively, which negates reasonable re-assembly and re-use due to damage to the panels and members during opening, breakdown, knockdown, or removal of the cargo from the crate. Previous corrugated crate designs were considered a onetime use option.

There is a need not satisfied by the prior art for a customizable shipping crate that is of reusable modular design and durable construction allowing for reuse of the crate or reuse of the discrete modular components, thereby decreasing waste and providing an environmentally sustainable solution to crating.

SUMMARY OF INVENTION

The present invention relates to a crate capable of enclosing and protecting an item to be shipped to include any necessary packaging or crating material, herein after referred to as the cargo. The inventive crate has a bottom base, two opposing side panels, two opposing interlocking end panels, and a top cap. The bottom base having a length and width larger than the X-width and Y-length dimensions of the cargo to be shipped, further including a bottom lip along its perimeter constructed of compressively fixated tabs. The opposing side panels are coextensive to the Y-length of the cargo as fitting within the bottom base lip and a height matching the cargo's Z-height with a thickness determined by the number of laminated corrugated sheets dictated per the necessary crush strength of the crate. If a particular cargo requires significant crush strength per high stacking requirements during shipping, the inventive corrugated crate may be customized to accommodate.

The interlocking end panels have a continuous exterior sheet to improve formability and structural strength, a center section constructed of corrugated end sheets, a side interlock having a width slightly less than the thickness of the side panel, and a corner tab. The corner tab and side interlock are separated by a shared corner fold that defines the axis that the corner tab swings around. The center sections are coextensive to the X-width of the cargo and of a thickness matching the side panels. When assembled, each side panel at each end insert against the side interlocks at each corner compressively secure with the folding over of each corner tab sandwiching the side panel between the slightly crushed corner tab and center section as held fast by the bottom lip. To complete assembly, the top cap covers the upper portion of the assembled side panels and end panels having the upper lip circumscribe and hold fast in the same manner as the bottom lip the crate components.

To break the crate down, the top cap is removed, the side panels are pulled out vertically and the components of the inventive crate are ready to be used again, or stored by putting the side panels in the bottom base, the end panels folded up on top of the side panels, and the top cap put over the bottom base.

For the preferred embodiment when additional strength and durability is desired, straps are positioned around the assembled components such that when tightened or fixated, the top cap and bottom base are secured together with the end panels and side panels compressed in between thereby keeping the assembly strong, durable when shipped, and easily broken down as described above and reused. Adhesive or double sided tape may be used to secure the corner tabs to the side panels as needed, usually not necessary for a new crate as first assembled, but as the modular components are reused the adhesive assists in maintaining tight tolerances and adequate crush strength. The adhesive or double sided tape is located between the corner tab's inner surface and the side panel outer surface. The use of adhesive complicates break down, but may prove necessary for some applications and the more adverse shipping environments.

When shipping the crate unassembled, the end panels stack upon themselves within the bottom base, the side panels fold up and stack side by side on top of the two side panels, and the top cap covers and slides over the bottom base making for a self-packaged shipping crate solution that is reusable, customizable, while having excellent crush strength to crate weight ratios.

As described above, the cargo dictates the internal dimensions of the customizable crate, and adding or subtracting corrugated sheets from the side panels eliminates the necessity for packing peanuts, paper, or other shipping crate filler to protect the cargo.

DETAILED DESCRIPTION OF THE DRAWINGS

Figure 1:
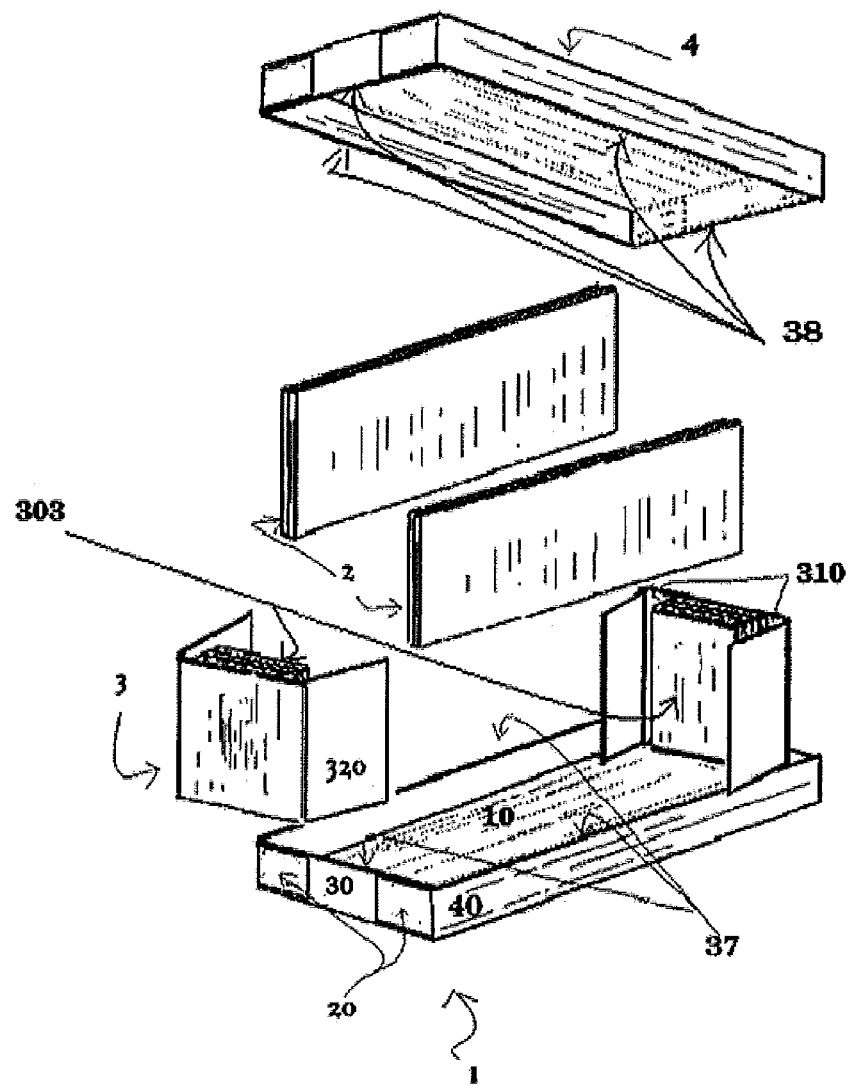
FIG. 1 is a perspective exploded view of a preferred embodiment of the invention.

Attentions should now be directed at the drawings, in particular FIGS. 1-6 in which reference numbers are used throughout to designate like components, and to illustrate how the components interconnect. As shown in FIG. 1, the preferred embodiment of the inventive crate has six discrete components having a bottom base 1 with side tabs 40 and end tabs 30 compressively interconnecting at the corners and fixated with a plurality of through fasteners thereby defining the bottom lip 37. The bottom lip 37 circumscribes the center base section 10 and holds together the end panels 3 and side panels 2 when assembled. The center base section 10 is at least two corrugated sheets thick with the option of adding additional sheets to increase rigidity. Each end tab 30 and edges of the center base section 10 are compressively held by the side tabs 40 when the side tabs 40 are folded up. The corrugated material allows for a 'crushing to fit' along the mating edges of the side tabs 40 and end tabs 30, thereby making for a superior strength with durable characteristics allowing for reuse of the inventive crate system numerous times.

For the preferred crate embodiment, the first step includes positioning each end panel 3 into the bottom base 1. Second, the side panels 2 slide down and against the end panels 3 at the side interlocks 310 where there is a slight crush of corrugated materials creating for a tight fit. Once this is done, the side tabs 40 keeps the corner tabs 320 in place. The bottom lip 37 keeps corner tabs 320 in place thereby securing the components together keeping them from moving.

When assembled as described above, the end panels 3 and side panels 2 fittingly insert within the perimeter of the bottom lip 37 and rests upon the bottom base 1. The top cap 4 covers the end panels 3 and side panels 2 as said panels insert and are contained within the upper lip 38 perimeter, thereby defining within a cavity for the cargo to be placed and shipped.

Figure 2:
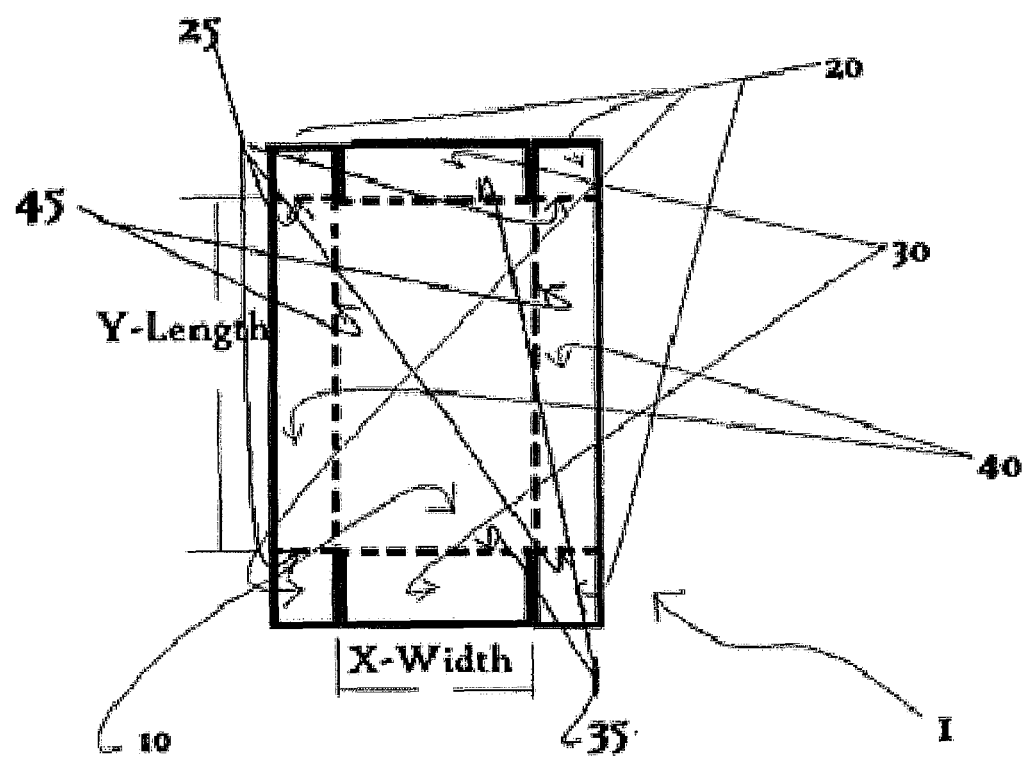
FIG. 2 is a top down view of the base section in the flat as shown in FIG. 1.

As shown in FIG. 2, the bottom base 1 has a center base section 10, end tabs 30, side tabs 40, and base corner tabs 20. The center base section 10 is constructed from at least one single layer of corrugated material, or constructed from two or more laminated corrugated sheets, or a wooden base, depending on the application and necessary strength requirements. For the preferred embodiment as used to ship heavier cargo, the center base section 10 is constructed entirely from corrugated sheets, using five laminated corrugated sheets to provide the required strength.

As shown in FIG. 2 the center base section 10 is constructed to match the Y-length and X-width of the item to be enclosed within the container. End Tabs 30 are located on the shorter side (X-Width) sharing end folds 35 (depicted with a dashed line) with the center base section 10. Each of the longer sides (Y-Length) have a side tab 40 also sharing a side fold 45 with the center base section 10, further including a base corner tab 20 at each side tab 40 end as defined by each base corner fold 25. When assembled, the end tabs 30 are folded up to substantially 90 degrees from the center base section 10, then the side tabs 40 are folded up to substantially 90 degrees from the center base section 10, finally the base corner tabs 20 are folded around each base corner fold 25 compressively securing the end tabs 30 and side tabs 40, thereby forming the bottom lip 37 shown in FIG. 1. After compressively fixating the center base section 10, adhering of the corner tabs 20 to the end tabs 30 may be accomplished using glue, double sided tape, or any other adhesion method and/or any combination of adhesion methods that are easily recyclable or allows reuse of the panels. For the preferred embodiment, the base section 10 is constructed as described above, and then clamped, or secured within a jig until the adhesion cures or is set.

The top cap 4 shown in FIG. 1. is of substantially similar construction as the bottom base 1 but having a slightly larger interior perimeter than the exterior perimeter of the bottom base 1 such that the bottom lip 37 slides within the upper lip 38, thereby facilitating the top cap 4 sliding over the bottom base 1 allowing for self-contained shipping of the crate when disassembled or facilitating stackable storage when not in use.

Figure 3:
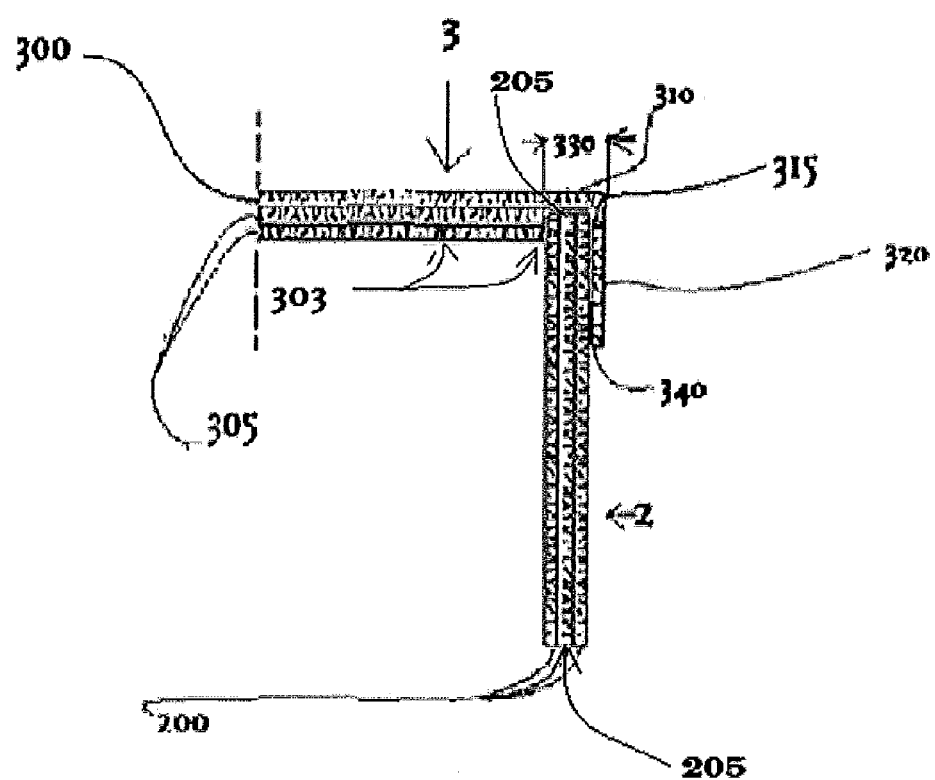
FIG. 3 is an enlarged top view of one corner of the crate shown in FIG. 1 as assembled.

As shown in FIG. 3., the end panel 3 and side panel 2 end portion 205 interlock at the corners having the end panel's 3 interlock width 330 match the side panel's 2 total thickness as measured at the end portion 205. The side panel's 2 thickness as between the end portions 205 or in total may be customized to accommodate specific cargo requirements or crush strength requirements of the crate, and in the preferred embodiment at least three corrugated side sheets 200 are laminated together using historically successful gluing and curing techniques.

The end panel 3 has an exterior side sheet 300 that runs continuous having the interlock width 330 and corner tab 320 sharing a single corner fold 315. The corrugated side sheets 305 are added to achieve desired strength and durability thereby determining the interlock width 330.

Figure 4:
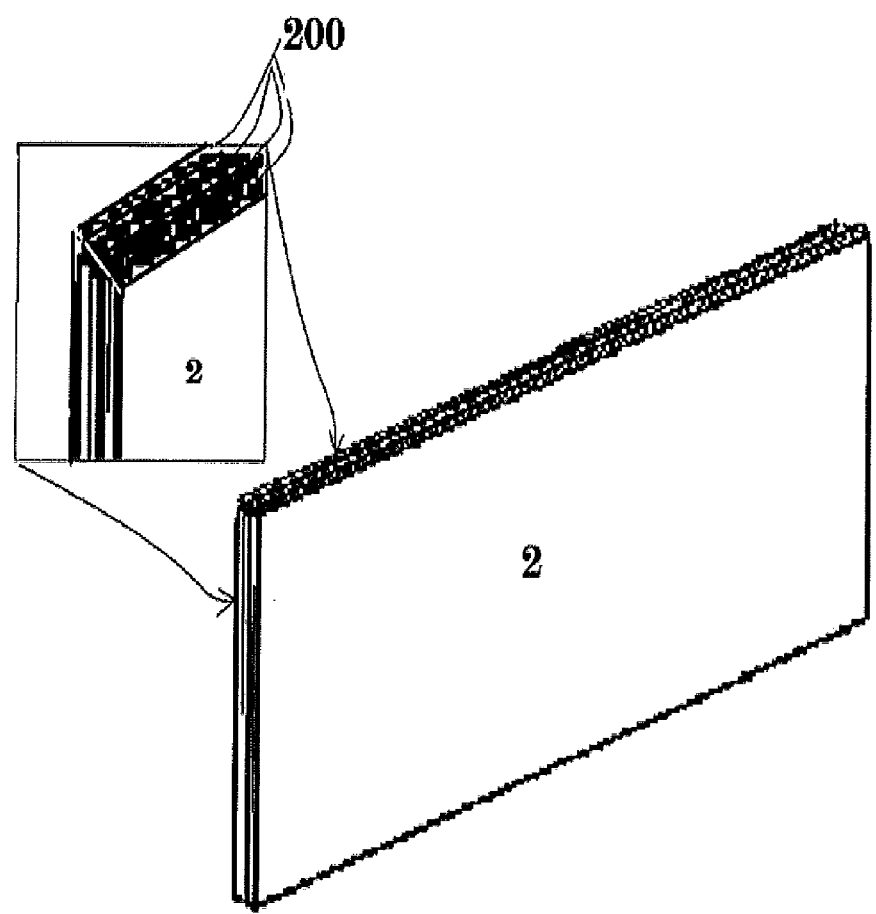
FIG. 4 is a prospective view of one side panel shown in FIG. 1.

As shown in FIG. 4, the side panels 2 benefit from a plurality of corrugated side sheets 200 all laminated together. The fluting of the corrugated material may be aligned in the vertical direction to increase vertical loading strength, or the fluting of the corrugated material may be aligned horizontally to increase horizontal loading strength. For the preferred embodiment the fluting direction is alternated to run both in the vertical direction and in the horizontal direction.

Figure 5:
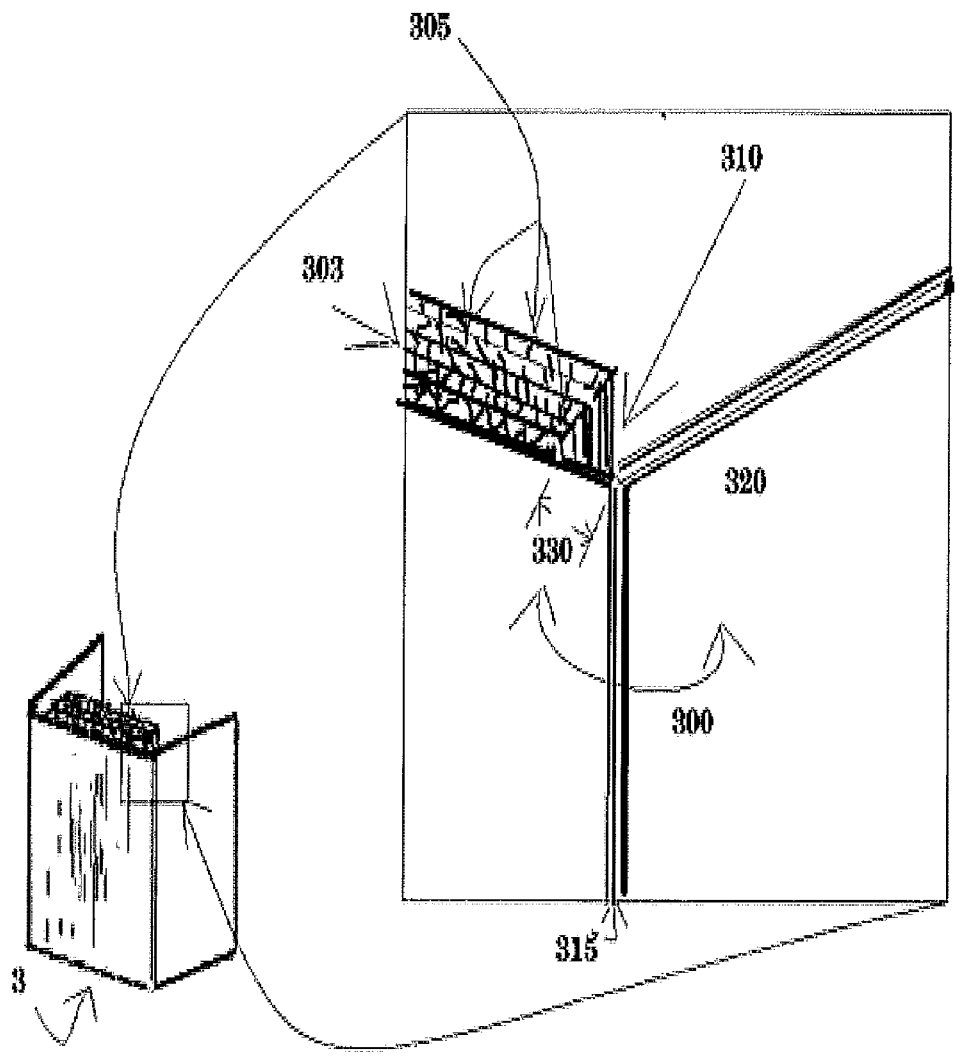
FIG. 5 is an end view of the embodiment shown in FIG. 1 in a storage position.

As shown in FIG. 5, the end panel 3 has at least one continuous exterior side sheet 300 constructing the corner tab 320 that swingably hinges around the corner fold 315 axis. As shown in FIG. 3, the side panel 2 fittingly inserts between the corner tab 320 and center section 303 until the side panel's 2 end abuts the side interlock 310. As the corner tab 320 hinges about its axis defined by the corner fold 315 and placed into bottom base 1 (shown in FIG. 1) then side panel 2 is dropped in from above and then the corrugate material of the corner tab 320 crushes, thereby compressively securing the components fixedly together making for a precise fit.

The preferred embodiment has at least two continuous exterior side sheets 300 thereby increasing durability along the corner fold 315 allowing for the crate system to be reused many times or customized with the addition of exterior side sheets 300 or additional corrugated sheets to the center section.

Figure 6:
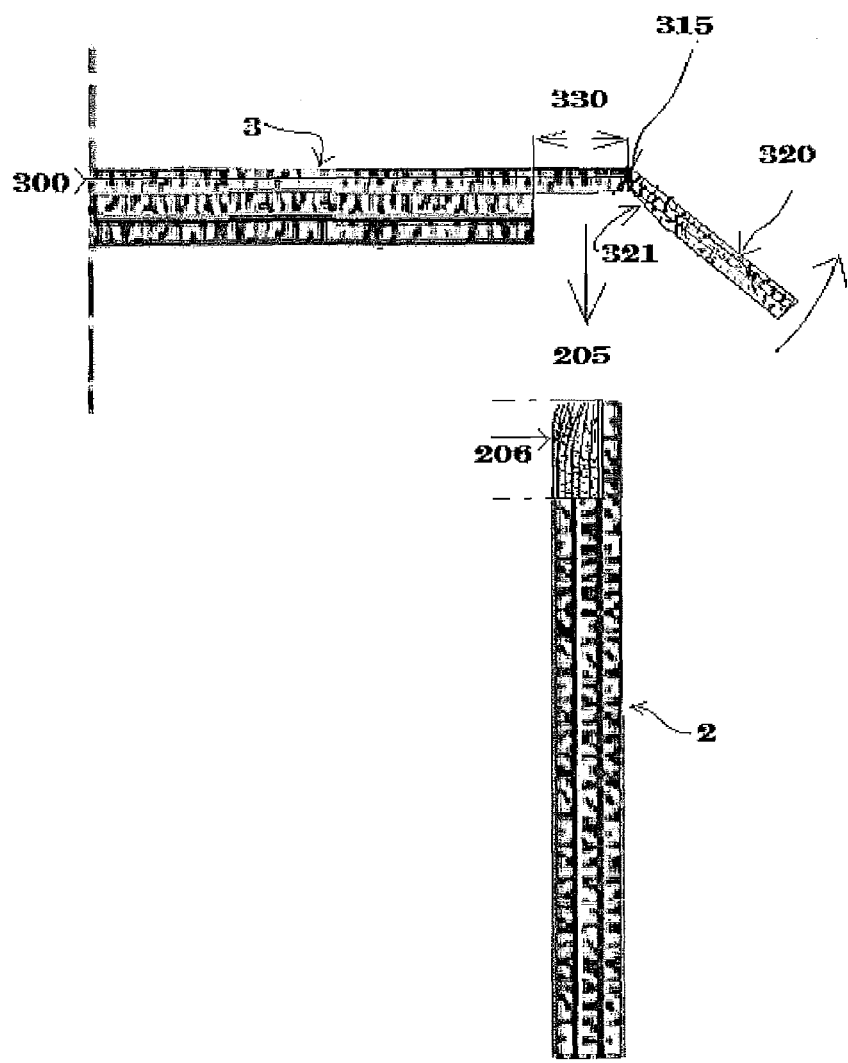
FIG. 6 is a top down view of the side panel and end panels illustrating the crushing fit.

As shown in FIG. 6 from the top perspective, the end panel 3 is shown having the corner tab 320 swung open illustrating crushed tab section 321. Said crushed tab section 321 compressively fitted as against the side panel 2 crushing slightly to secure the side panel 2. The side panel 2 also is illustrated in detail showing the crushed side panel 206 fittingly inserts and crushingly fits within the interlock width 330. The side panel 2 and corner tab 320 may be customized by adding or taking out sheets from the lamination to encourage a secure crushing fit. The detail of the crushed side panel 206 and crushed tab section 321 illustrates how the crushed corrugated material compressively forms and fits without tolerance thereby making for a strong interlock that is secure and durable.

It is recognized that mediums other than corrugated cardboard or paper board can be used based on current technology and future improvements in technology. Corrugated cellulose or other plant based mediums would be preferred if structurally sound and durable for the application with the necessary resiliency to create the crush fit. Corrugated plastic is one of the most durable corrugated material allowing for many times of reuse over corrugated cardboard or paper products, but the corrugated plastic does not compost or breakdown, thus requiring special recycling, making it less desirable in the environmentally sustainable sense.

It is highly preferable that the two side panels and two end panels of the described embodiments are essentially identical. Redundancy in fabrication provides an economy of force in the manufacturing of the inventive crate system.

The described and shown embodiment, while illustrative of the invention, does not limit the present invention to the various embodiments described herein, but includes any and all embodiments having equivalent elements, modifications, omissions, combinations, adaptations and/or alterations as would be appreciated by those skilled in the art. The manner of compressively connecting the components together using the corner fold as a hinge may be varied, and other modifications will occur to those skilled in the art without departing from the true scope of invention as defined and described in the claims. The claims are to be interpreted broadly based on the language employed in the claims as defined by the specification, and not limited by the disclosure of specific embodiments, configuration, or illustrations herein.

What is claimed is:

1. A modular corrugated reusable crate having a bottom base, two opposing side panels, two opposing interlocking end panels, and a top cap that when assembled defines a cavity for receiving cargo placed therein, comprising:

said bottom base having a center base section, end tabs, side tabs, and corner tabs all constructed from at least one sheet of corrugated material having the end tabs and side tabs folded up forming a bottom lip;

said top cap being of substantially the same construction as the bottom base but having a top lip constructed and arranged to fit over said bottom lip;

said side panels constructed of at least two corrugated side sheets laminated together;

said end panels constructed from at least two continuous corrugated end sheet forming a corner tab, corner fold, and side interlock at each end with a center section in between said side interlocks, said center section constructed from at least two corrugated sheets, such that when the crate is assembled, each side panel end portions abut the side interlocks and are compressively secured by the corner tabs swinging about the corner fold axis compressing the side panel between the corner tab and the center section crushing the corrugated sheet material, all held secure by the bottom lip and top lip.

2. The apparatus of claim 1, wherein the corrugated sheets are manufactured from compostable materials.

3. The apparatus of claim 1, wherein modular components are interchangeable with different crating configurations.

4. The apparatus of claim 1, wherein said side panels and end panels fit within the bottom base enclosed by the top cap when disassembled.

5. A modular corrugated reusable crate having a bottom base, two opposing side panels, two opposing interlocking end panels, and a top cap that when assembled defines a cavity for receiving cargo placed therein, comprising:

said bottom base having a center base section, end tabs, side tabs, base corner tabs and base corner fold, all constructed from at least two continuous laminated sheets of corrugated material having the end tabs folded up and the side tabs folded up thereby compressing against said end tabs thereby defining a bottom lip secured together by the base corner tabs swinging about the base corner fold axis crushing said end tabs between said side tabs, said base corner tabs adhering to said end tabs;

said top cap being of substantially the same construction as the bottom base but having a top lip constructed and arranged to fit over said bottom lip;

said side panels constructed of at least two corrugated side sheets laminated together;

said end panels constructed from at least one continuous corrugated end sheet forming a corner tab, corner fold, and side interlock at each end with a center section in between said side interlocks, said center section constructed from at least two corrugated sheets laminated together, such that when the crate is assembled, each side panel end portions abut the side interlocks and are compressively secured by the corner tabs swinging about the corner fold axis compressing the side panel between the corner tab and the center section crushing the corrugated sheet material, all held secure by the bottom lip and top lip.

6. The apparatus of claim 5, wherein the corrugated sheets are manufactured from compostable materials.

7. The apparatus of claim 5, wherein modular components are interchangeable with different crating configurations.

8. The apparatus of claim 5, wherein said side panels and end panels fit within the bottom base enclosed by the top cap when disassembled.

* * * * *